United States Patent
Osawa

(10) Patent No.: US 11,190,698 B2
(45) Date of Patent: Nov. 30, 2021

(54) IMAGING APPARATUS, CONTROL METHOD FOR IMAGING APPARATUS, INFORMATION PROCESSING APPARATUS, AND STORAGE MEDIUM

(71) Applicant: CANON KABUSHIKI KAISHA, Tokyo (JP)

(72) Inventor: Takaharu Osawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 16/684,839

(22) Filed: Nov. 15, 2019

(65) Prior Publication Data

US 2020/0177817 A1 Jun. 4, 2020

(30) Foreign Application Priority Data

Nov. 30, 2018 (JP) .............................. JP2018-224453

(51) Int. Cl.
*H04N 5/232* (2006.01)

(52) U.S. Cl.
CPC ..... *H04N 5/23296* (2013.01); *H04N 5/23212* (2013.01)

(58) Field of Classification Search
CPC ........... H04N 5/23212; H04N 5/23296; H04N 5/232125; H04N 5/232127; H04N 5/23216; H04N 5/23218; G08B 13/1963
See application file for complete search history.

(56) References Cited

U.S. PATENT DOCUMENTS

| 7,683,963 | B2 * | 3/2010 | Huang | ............... H04N 5/23212 348/348 |
| 9,497,190 | B2 | 11/2016 | Osawa | |
| 2010/0231713 | A1 * | 9/2010 | Oyabu | ................... H04N 7/183 348/143 |
| 2017/0272658 | A1 * | 9/2017 | Ito | .......................... G03B 13/02 |

FOREIGN PATENT DOCUMENTS

| JP | 2017093904 A | 6/2017 |
| JP | 2017173802 A | 9/2017 |

* cited by examiner

*Primary Examiner* — Nelson D. Hernández Hernández
(74) *Attorney, Agent, or Firm* — Carter, DeLuca & Farrell LLP

(57) ABSTRACT

An imaging apparatus includes: a focus controller configured to adjust focus by driving a lens; a relative tilt angle controller configured to incline a focus surface by controlling a relative tilt angle of the lens to an image sensor; and an acquisition unit configured to acquire an installation angle of the imaging apparatus based on a relative tilt angle and a distance from a standard surface on the focus surface inclined in accordance with the standard surface. The acquisition unit acquires a relative tilt angle when the focus surface is inclined in accordance with a height of a subject based on the installation angle and a distance between the standard surface and height information of the subject, and outputs the relative ti It angle to the relative tilt angle controller.

14 Claims, 8 Drawing Sheets

FIG. 5A

| | Height (m) |
|---|---|
| Height information 1 of subject | 1.5 |

Please input height of subject

Height of face of person: [ 5012 ] m

OK    Cancel
5013  5014

IMAGING APPARATUS, CONTROL METHOD FOR IMAGING APPARATUS, INFORMATION PROCESSING APPARATUS, AND STORAGE MEDIUM

BACKGROUND OF THE INVENTION

Field of the Invention

The present invention relates to an imaging apparatus, a control method for the imaging apparatus, an information processing apparatus, and a storage medium.

Description of the Related Art

Surveillance cameras are installed in high locations and optical axes of the cameras are oriented diagonally downward to surveil people passing roads or image automobiles or license plates of the automobiles in some cases. In these cases, since the optical axes of the cameras are diagonally downward, focus surfaces which are in focus at the time of imaging are surfaces orthogonal to the optical axes and do not match subject surfaces which are targets on which imaging is actually performed. Therefore, a depth range in which focus is achieved is a part of a screen (only within a depth of field) and other regions become out of focus.

To solve this problem, there is a method of preventing loss of focus by narrowing a diaphragm of an optical system and deepening a depth of field. However, in surveillance cameras performing imaging under low illuminance, diaphragms are almost fully opened for imaging in many cases. As a result, the depth of field may become shallow, focus may be lost in the depth of an entire screen, and imaging may be performed in an out-of-focus state.

To solve the above problem, there is a method of widening the range of the depth of field by inclining a lens relative to an image sensor. On the other hand, there is a technology for widening the range of the depth of field by inclining an image sensor relative to a lens (inclining a lens or an image sensor and changing a relative angle between the lens and the image sensor is hereinafter referred to as 'relative tilting_). By applying this technology to surveillance cameras, it is possible to widen a range in which focus is achieved even in an open state of a diaphragm and it is possible to perform surveillance up to a long distance using one camera. In the case of a structure for controlling an inclination of an image sensor by driving of a stepping motor, an inclination angle per pulse is determined by driving of the stepping motor and a gear ratio of gears. Therefore, by designating an inclination angle of an image sensor (a relative angle of a lens to an image sensor is hereinafter referred to as a relative tilt angle) with the number of pulses, it is possible to perform control such that the image sensor is at a desired relative tilt angle.

As rotation axes of tilting of an image sensor, there are various rotation axes such as vertical tilting in which an image sensor is rotated using a central line of the image sensor in a long-side direction as an axis and horizontal tilting in which an image sensor is rotated using a central line of the image sensor in a short-side direction as an axis. When such tilting technologies are used, a range in which focus is achieved in the horizontal direction at a certain height from the ground can be widened. Thus, for example, a camera for surveillance can adjust focus to the heights of the faces of people and ascertain many faces at one time.

Japanese Unexamined Patent Publication No. 2017-173802 discloses a technology for widening a range of the depth of field by detecting an out-of-focus amount in a plurality of focus detection regions included in an imaging unit and adjusting an image sensor to an optimum relative tilt angle based on the detected out-of-focus amount. Japanese Unexamined Patent Publication No. 2017-093904 discloses an imaging apparatus that includes a tilting mechanism that inclines one of an optical axis of a light reception surface and a lens optical axis with respect to the other by rotating the light reception surface or the imaging lens. The imaging apparatus disclosed in Japanese Unexamined Patent Publication No. 2017-093904 matches a focus surface by controlling the tilting mechanism based on image data analyzed by an image analysis unit.

However, determining a relative tilt angle depends on the position of a focus lens. Therefore, when a relative tilt position is determined, it is necessary to determine the tilt position in accordance with a combination of two parameters, a relative tilt angle and a focus position. Therefore, it is difficult to manually adjust a relative tilt range in which focus of tilt is achieved and it may take time and labor. For example, when a subject is a person and focus is adjusted to a height of the face of the person, a plurality of people are actually within an imaging range. When the face of a person is on an optical axis of a lens, the focus may not be adjusted. Therefore, it is not easy to adjust the focus at the time of installation.

SUMMARY OF THE INVENTION

The present invention provides an imaging apparatus capable of adjusting focus at the height of a face or the like from the front to the rear even when a subject such as the face of a person is not actually in an image.

In order to achieve the object, according to an embodiment of the present invention, an imaging apparatus includes: a focus controller configured to adjust focus by driving a lens; a relative tilt angle controller configured to incline a focus surface by controlling a relative tilt angle of the lens to an image sensor; and an acquisition unit configured to acquire an installation angle of the imaging apparatus based on a relative tilt angle and a distance from a standard surface on the focus surface inclined in accordance with the standard surface. The acquisition unit acquires a relative tilt angle when the focus surface is inclined in accordance with a height of a subject based on the installation angle and a distance between the standard surface and height information of the subject, and outputs the relative ti It angle to the relative tilt angle controller.

Further features of the present invention will become apparent from the following description of exemplary embodiments with reference to the attached drawings.

BRIEF DESCRIPTION OF THE DRAWINGS

FIGS. 5A and 5B are diagrams illustrating examples of height information.

DESCRIPTION OF THE EMBODIMENTS

Hereinafter, preferred embodiments of the present invention will be described in detail with reference to the appended drawings.

First Embodiment

Figure 1:
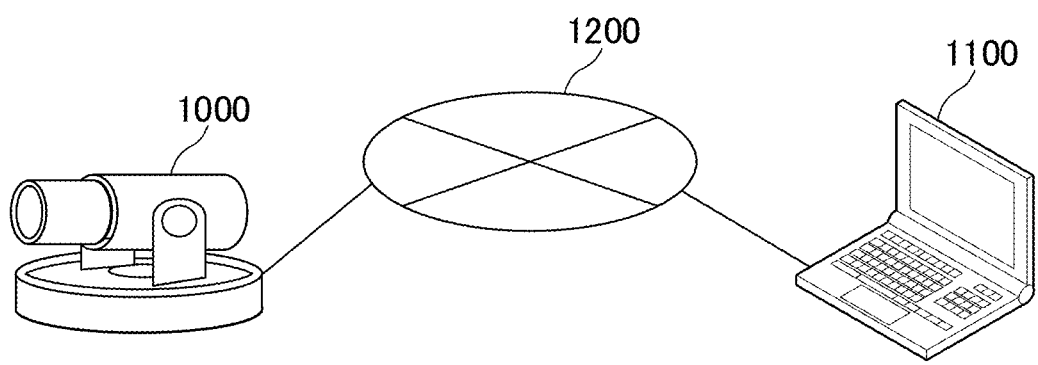
FIG. 1 is a system configuration diagram illustrating a surveillance camera according to a first embodiment.

A network configuration according to an embodiment of the present invention will be described with reference to FIG. 1. FIG. 1 is a system configuration diagram illustrating a surveillance camera according to a first embodiment of the present invention. A surveillance system 1 which is an imaging system includes a surveillance camera 1000 which is an imaging apparatus, a control apparatus 1100 (an information processing apparatus or a client apparatus) of the surveillance camera 1000, and a network 1200. The surveillance camera 1000 and the control apparatus 1100 are connected to be communicable with each other via the network 1200. The control apparatus 1100 transmits various commands to the surveillance camera 1000. The surveillance camera 1000 transmits responses to the commands to the control apparatus 1100.

The network 1200 is, for example, a plurality of routers, switches, cables, and the like that satisfy a communication standard such as Ethernet (trademark). In the embodiment, any communication standard, any scale, and any configuration can be used as long as communication between the surveillance camera 1000 and the control apparatus 1100 is possible. Accordingly, the network 1200 may be, for example, a wired local area network (LAN), a wireless LAN, or a wide area network (WAN).

To facilitate description, only one surveillance camera is illustrated in the drawing, but two or more surveillance cameras may be included. In addition to the control apparatus 1100, other control apparatuses that access the surveillance camera 1000 and receive or accumulate images may also be included.

Figure 2:
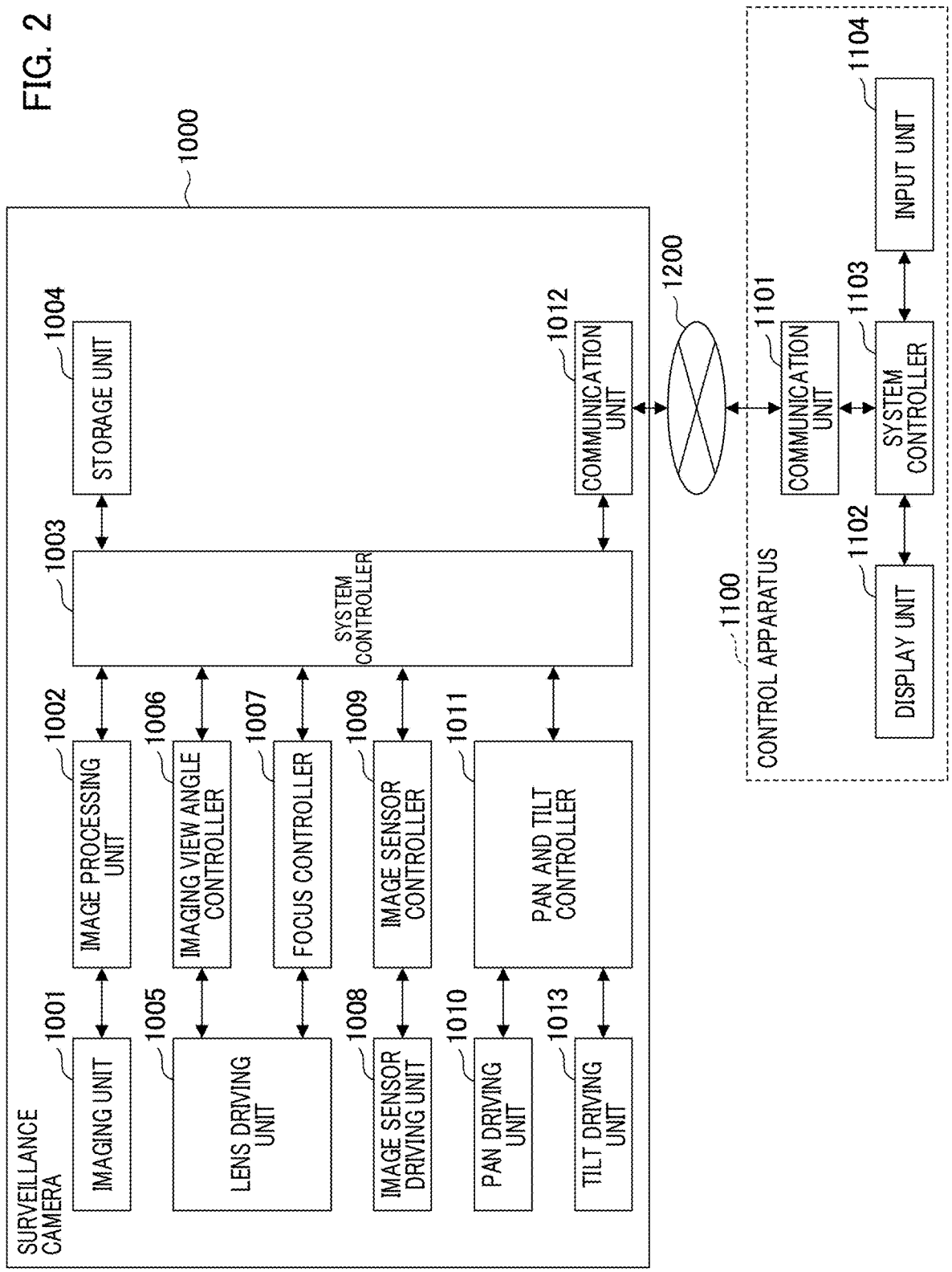
FIG. 2 is a functional block diagram and a system configuration diagram of the surveillance camera and a control apparatus according to the first embodiment.

FIG. 2 is a functional block diagram and a system configuration diagram of the surveillance camera and a control apparatus according to the first embodiment. First, a configuration and a function of each unit of the surveillance camera 1000 will be described. The surveillance camera 1000 includes an imaging unit 1001, an image processing unit 1002, a system controller 1003, a storage unit 1004, a lens driving unit 1005, an imaging viewing angle controller 1006, a focus controller 1007, an image sensor driving unit 1008, and an image sensor controller 1009. The surveillance camera 1000 further includes a pan driving unit 1010, a tilt driving unit 1013, a pan and tilt controller 1011, and a communication unit 1012.

The imaging unit 1001 includes a lens and an image sensor and performs imaging of a subject and conversion to an electric signal. The image processing unit 1002 performs predetermined image processing and a compression encoding process on a signal obtained through imaging and photoelectric conversion in the imaging unit 1001, and generate video data.

The system controller 1003 analyzes a camera control command transmitted from the control apparatus 1100 and performs a process in response to a command. Primarily, the system controller 1003 receives a request command for a live video from the control apparatus 1100 and delivers video data generated in the image processing unit 1002 via the communication unit 1012. In addition, the system controller 1003 receives request commands for a zoom setting value, a focus setting value, a relative tilt angle setting value, and a pan and tilt setting value of the surveillance camera 1000 from the control apparatus 1100. The system controller 1003 reads the setting values from the imaging viewing angle controller 1006, the focus controller 1007, the image sensor controller 1009, and the pan and tilt controller 1011 and delivers the setting value to the control apparatus 1100 via the communication unit 1012.

Further, when various setting commands are received, the system controller 1003 commands the imaging viewing angle controller 1006, the focus controller 1007, the image sensor controller 1009, and the pan and tilt controller 1011 to perform control based on the setting values. Here, the various setting commands are, for example, zoom, focus, relative tilt angle, and pan and tilt setting commands. The imaging viewing angle controller 1006, the focus controller 1007, the image sensor controller 1009, and the pan and tilt controller 1011 control the lens driving unit 1005, the image sensor driving unit 1008, the pan driving unit 1010, and the tilt driving unit 1013 based on the commands. Thus, the zoom, focus, relative tilt angle, and pan and tilt setting values set by the control apparatus 1100 are reflected in the surveillance camera 1000. The system controller 1003 also acquires a relative tilt angle and a focal length in a flow to be described below. The details thereof will be described later.

The storage unit 1004 stores videos and various kinds of data in an internal storage and an external storage. The imaging viewing angle controller 1006 commands the lens driving unit 1005 to change the position of a zoom lens based on the zoom setting value output from the system controller 1003. The focus controller 1007 commands the lens driving unit 1005 to change the position of a focus lens based on the focus setting value output from the system controller 1003. When the position of the focus lens is changed, a focus position is changed. The image sensor controller 1009 commands the image sensor driving unit 1008 to change a relative tilt angle of an image sensor based on the relative tilt angle setting value output from the system controller 1003. The pan and tilt controller 1011 commands the pan driving unit 1010 and the tilt driving unit 1013 to change pan and tilt based on the pan and tilt setting values output from the system controller 1003.

The communication unit 1012 delivers video data to the control apparatus 1100 via the network 1200. The communication unit 1012 receives various commands transmitted from the control apparatus 1100 and outputs the commands to the system controller 1003. The commands transmitted from the control apparatus 1100 primarily include a request command for a live video, request commands for the zoom, focus, relative tilt angle and pan and tilt setting values, and setting commands of the surveillance camera 1000.

The lens driving unit 1005 includes a driving system of a focus lens and a zoom lens and a driving source motor and is controlled by the imaging viewing angle controller 1006 and the focus controller 1007. The image sensor driving unit 1008 changes (inclines) an angle of a sensor surface of an image sensor such as CCD or CMOS with respect to an optical axis of a lens. The pan driving unit 1010 includes a driving source motor and a mechanical driving system performing a pan operation and an operation of the pan driving unit 1010 is controlled by the pan and tilt controller 1011. The tilt driving unit 1013 includes a driving source motor and a mechanical driving system performing a tilt operation and an operation of the tilt driving unit 1013 is controlled by the pan and tilt controller 1011.

Next, a configuration and a function of each unit of the control apparatus 1100 will be described. The control apparatus 1100 is generally assumed to be a general-purpose computer such as a personal computer, but the present invention is not limited thereto. The control apparatus 1100 may be, for example, a portable terminal such as an external apparatus. The control apparatus 1100 includes a communication unit 1101, a display unit 1102, a system controller 1103, and an input unit 1104.

The communication unit 1101 transmits various commands issued from the control apparatus 1100 or receives various kinds of data delivered from the surveillance camera 1000. The various commands include request commands for a live video, request commands for zoom, focus, relative tilt angle, and pan and tilt setting values of the surveillance camera 1000 and zoom, focus, relative tilt angle, and pan and tilt setting commands of the surveillance camera 1000. The various kinds of data primarily include information regarding an imaging viewing angle including zoom, information regarding focus, information regarding tilt, information regarding pan and tilt, and video data of the surveillance camera 1000.

A liquid crystal display device or the like is used as the display unit 1102. The display unit 1102 displays an image acquired from the surveillance camera and displays a graphical user interface (GUI) to perform camera control. The system controller 1103 generates a camera control command in response to a GUI operation of a user and transmits the camera command to the surveillance camera 1000 via the communication unit 1101. The system controller 1103 displays video data received from the surveillance camera 1000 via the communication unit 1101 and data indicating the setting values of an imaging viewing angle including zoom, focus, a relative tilt angle, and pan and tilt on the display unit 1102. A pointing device such as keyboard or a mouse is used as the input unit 1104. A user of the control apparatus 1100 operates the GUI via the input unit 1104.

Figure 3:
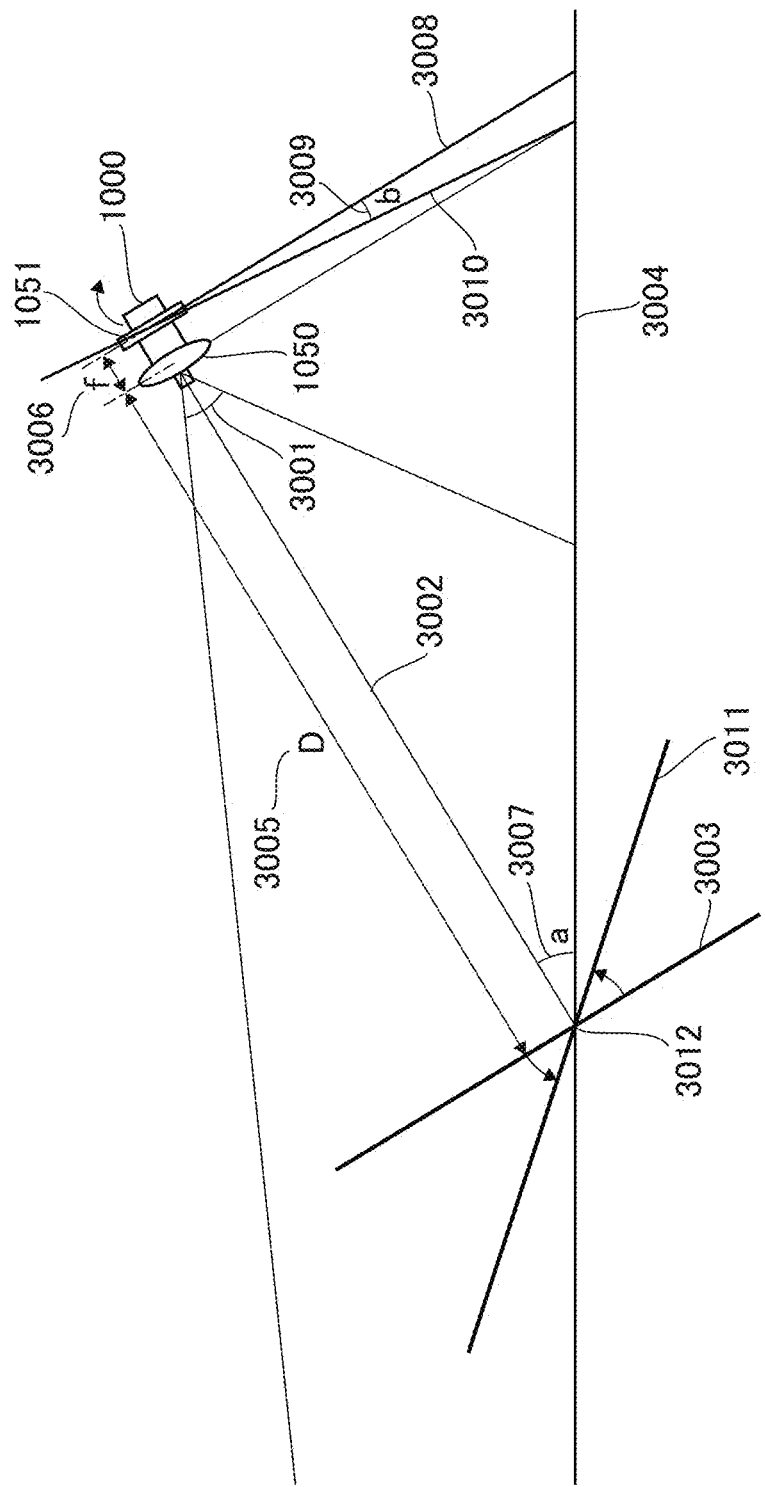
FIG. 3 is a schematic diagram illustrating an example of a use state of the surveil lance camera according to the first embodiment.

Next, a structure of relative tilt control will be described with reference to FIG. 3. FIG. 3 is a schematic diagram illustrating an example of a use state of the surveillance camera 1000 according to the first embodiment. The drawing illustrates a case in which an environment imaged by the surveillance camera 1000 is seen horizontally. In the drawing, the surveillance camera 1000 images a range of a viewing angle 3001. The surveillance camera 1000 includes a lens 1050 and an image sensor 1051.

A focus surface 3003 is a focusing position for focus which is in a non-relative tilt state. At this time, the focus surface 3003 is perpendicular to an optical axis 3002 of the surveillance camera 1000. FIG. 3 illustrates an example of a case in which the focusing position for focus matches a position 3012 on a ground 3004. In the drawing, a distance between the surveillance camera 1000 and a subject which is in focus (in the drawing, the position 3012) is a distance 3005 (D), and a distance between the lens 1050 and the image sensor 1051 is a focal length 3006 (f). An installation angle of the surveillance camera 1000 is an installation angle 3007 (a). A sensor surface 3008 in FIG. 3 is expressed as a sensor surface when relative tilting is not performed. A sensor surface when a sensor surface is inclined by a relative tilt angle 3009 (b) from the state of the sensor surface 3008 in the non- relative tilt state is a sensor surface 3010 and a focusing position for focus at that time is a focus surface 3011.

The relative tilt angle b when the above-described focus surface 3003 is inclined to the focus surface 3011 is expressed as in Expression (1) below based on the Scheimpflug principle.

$$b = \arctan(f/D \tan a) \quad (1)$$

That is, the relative tilt angle 3009 (b) can be obtained based on the distance 3005 (D) to the subject and the installation angle 3007 (a) of the surveillance camera 1000.

When Expression (1) is modified to an expression of the installation angle a, Expression (1) can be expressed as in Expression (2).

$$a = \arctan(f/D \tan b) \quad (2)$$

That is, the installation angle 3007 (a) of the surveillance camera 1000 can be obtained based on the distance 3005 (D) to the subject and the relative tilt angle 3009 (b).

Figure 4:
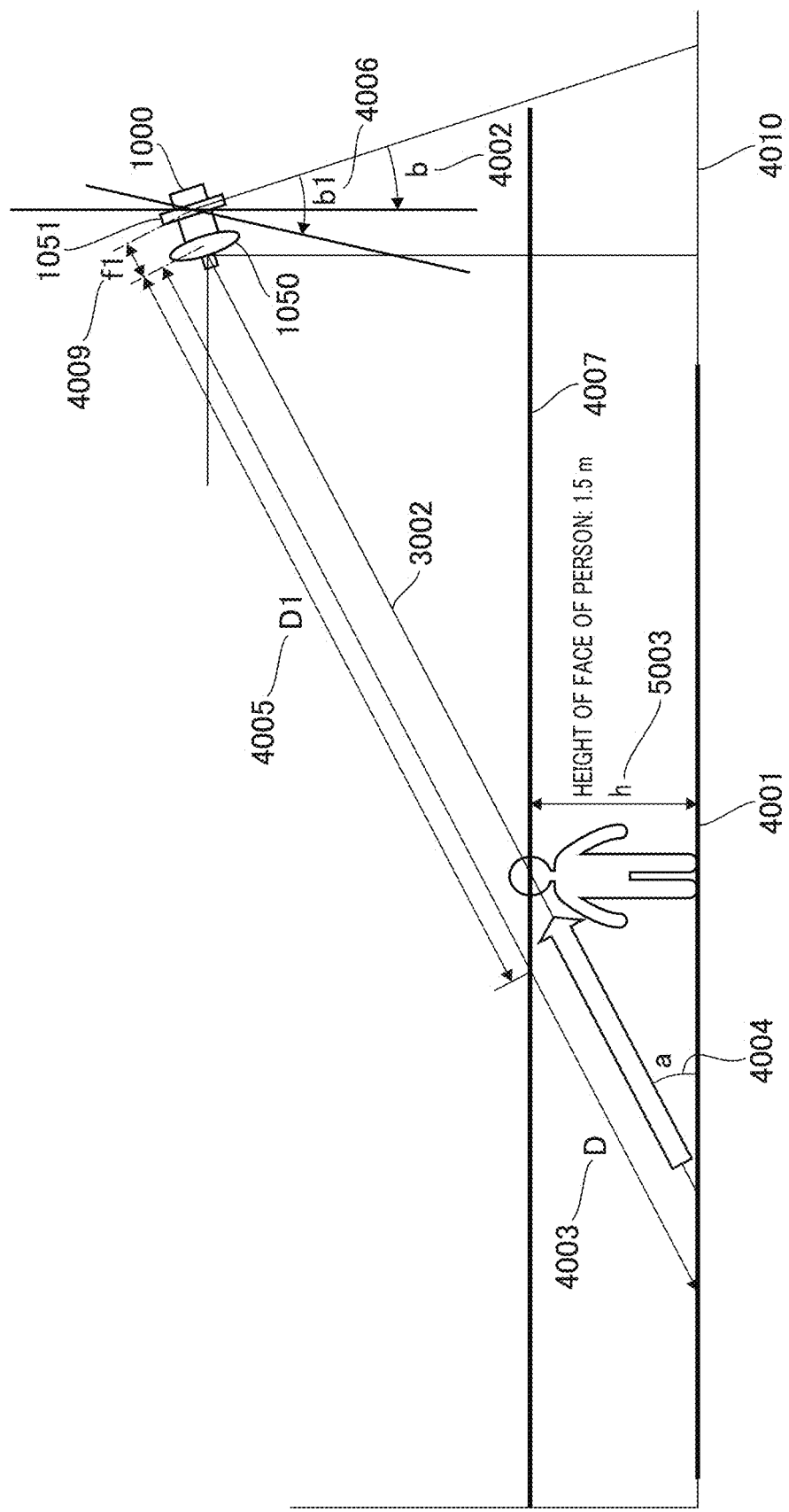
FIG. 4 is a diagram for describing a process according to the first embodiment.

Next, a process of matching a standard surface (in the embodiment, the ground) to the focus surface by adjusting a relative tilt angle and subsequently raising the focus surface to a constant height (for example, a face height of 1.5 m or the like when an imaging target subject is a person) in the horizontal direction will be described with reference to FIG. 4. FIG. 4 is a diagram for describing a process according to the first embodiment. First, the focus controller 1007 adjusts the position of the lens 1050 to be focused on the ground (standard surface) on an extension line of the optical axis 3002. Thus, the system controller 1003 acquires the distance D to the standard surface from the imaging viewing angle controller 1006, the focus controller 1007, or the image sensor controller 1009 in accordance with a scheme such as an image surface phase difference scheme or the position of a lens by a contrast scheme. The system controller 1003 also acquires the focal length f similarly.

Subsequently, the relative tilt angle is changed so that a focus surface matches a horizontal standard surface 4010 (for example, the ground). FIG. 4 illustrates a state in which a focus surface 4001 is aligned with the horizontal standard surface 4010. A method of changing a relative tilt angle so that the focus surface matches the horizontal standard surface 4010 is not limited. For example, the image sensor driving unit 1008 may incline the sensor surface of the image sensor 1051 with respect to the optical axis 3002, and the pan driving unit 1010 and the tilt driving unit 1013 may incline the optical axis of the lens with respect to the sensor surface of the image sensor 1051 to change the relative tilt angle. In the embodiment, to facilitate description, a case in which the image sensor driving unit 1008 inclines the sensor surface of the image sensor 1051 with respect to the optical axis 3002 will be described as an example.

When the focus surface temporarily matches the horizontal standard surface 4010, the relative tilt angle 4002 (b) at which the focus surface matches the standard surface 4010 can be acquired. As a result, the installation angle 4004 (a) can be obtained based on Calculation Expression (2) described above, the relative tilt angle 4002 (b), and the distance 4003 (D) to the standard surface.

Next, a process of horizontally moving the focus surface 4001 matching the horizontal standard surface 4010 up to a constant height to match a height of a subject (for example, when the imaging target subject is a person, the height of the faces is 1.5 m) or the like will be described. The storage unit 1004 stores height information of the subject. FIGS. 5A and 5B are diagrams illustrating examples of the height information. FIG. 5A is a diagram illustrating an example of a table that shows the height information of the subject. The storage unit 1004 stores a table 5001 that shows the height information of the subject, as illustrated in FIG. 5A. In the table 5001, a value 5003 of the height of the subject is included as height information 5002 of the subject. In the drawing, only one piece of height information of the subject is illustrated. However, the number of pieces of height information of the subject is not limited to 1. A plurality of pieces of height information of the subject may be stored.

FIG. 5B is a diagram illustrating an example of a user interface (UI) designating height information of a subject. A user can set the height of a subject using a setting page output from the surveillance camera 1000 to the control apparatus 1100. A setting UI 5011 illustrated in FIG. 5B includes an input field 5012 for a setting value, an OK button 5013, and a cancellation button 5014. A plurality of methods of designating the height of a subject are considered. For example, when focus is adjusted to the face of a person, a method of directly designating the height of a center of a face (for example, the position of the nose) is used. However, a method of designating the height of a person and estimating the position of the face on a camera side can be considered.

Referring to FIG. 4, the description will continue. Based on a set height 5003 (h) of the subject, a relative tilt angle 4006 (b1) used to match the focus surface to a horizontal surface 4007 at the height 5003 of the subject is obtained using the above-described Expression (1). Therefore, a distance 4005 (D1) from the surveillance camera 1000 to the surface 4007 is first obtained. The distance D1 can be calculated with Calculation Expression (3) below.

$$D1 = D - h/\sin a \quad (3)$$

The system controller 1003 can also acquire a focal length 4009 (f1) at the time of focusing on the subject which is at the position of the distance D1 based on the distance D1 from the surveillance camera 1000 to the surface 4007. The system controller 1003 acquires a focal length 4009 (f1) from the imaging viewing angle controller 1006, the focus controller 1007, or the image sensor controller 1009. Thus, the relative tilt angle 4006 (b1) can be obtained using the above-described Expression (1) based on the distance 4005 (D1), the installation angle 4004 (a) and the focal length 4009 (f1). The system controller 1003 outputs the relative tilt angle 4006 (b1) obtained in this way to the image sensor controller 1009. The image sensor controller 1009 changes the relative tilt angle by causing the image sensor driving unit 1008 to drive the image sensor 1051 based on the relative tilt angle output from the system controller 1003. The system controller 1003 also outputs the acquired focal length 4009 (f1) to the focus controller 1007. The focus controller 1007 causes the lens driving unit 1005 to change the position of the lens based on the focal length 4009 (f1) output from the system controller 1003. Thus, it is possible to move the focus surface 4001 matching the horizontal standard surface 4010 to match the horizontal surface 4007 at the height 5003 of the subject. Even in a state in which the subject is not actually imaged, focus can be adjusted at the height of the subject.

When the pan driving unit 1010 or the tilt driving unit 1013 changes the relative tilt angle, the system controller 1003 outputs the obtained relative tilt angle 4006 (b1) to the pan and tilt controller 1011. The pan and tilt controller 1011 drives the pan driving unit 1010 or the tilt driving unit 1013 to change the relative tilt angle based on the relative tilt angle output from the system controller 1003.

Figure 6:
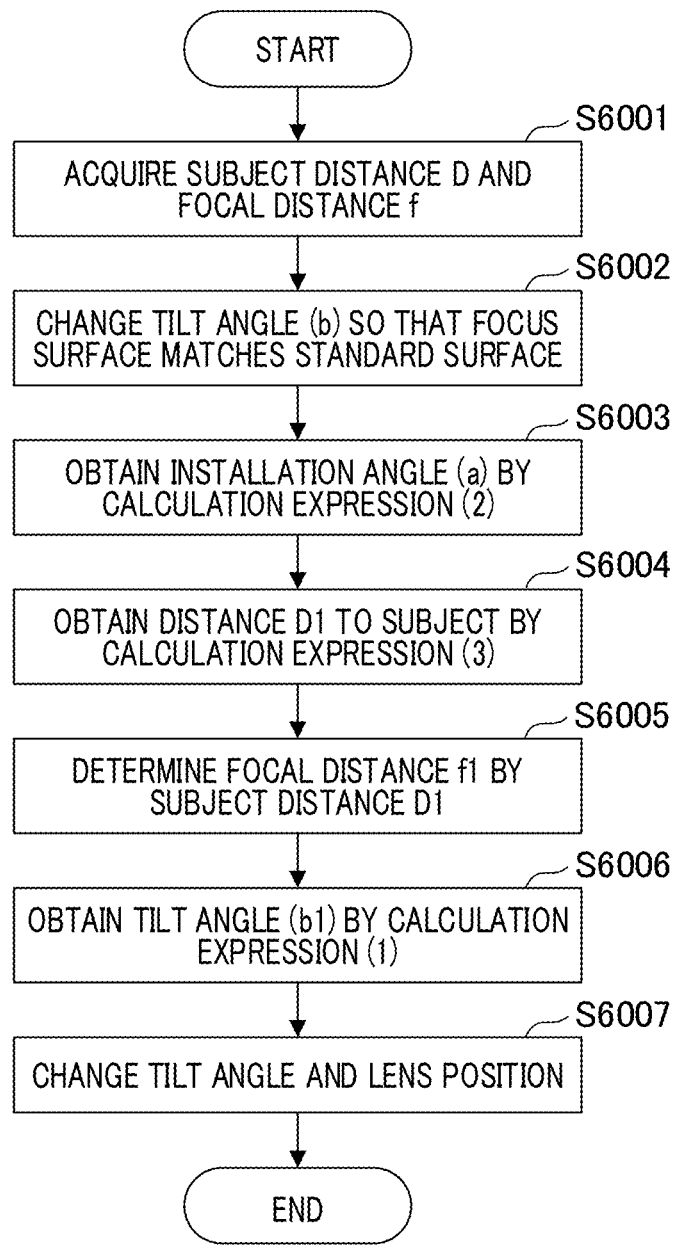
FIG. 6 is a flowchart illustrating the process according to the first embodiment.

FIG. 6 is a flowchart illustrating the process according to the first embodiment. Each step can be mainly performed under the control of each unit by the system controller 1003. In step S6001, the system controller 1003 acquires the distance 4003 (D) in FIG. 4 and the focal length f at the time of focusing on the standard surface from the imaging viewing angle controller 1006, the focus controller 1007, or the image sensor controller 1009. Subsequently, in step S6002, the image sensor controller 1009 causes the image sensor driving unit 1008 to incline the sensor surface of the image sensor 1051 with respect to the optical axis 3002. Thus, the relative tilt angle 4002 (b) is changed so that the focus surface matches the horizontal standard surface 4010 (for example, the ground). In step S6003, the system controller 1003 obtains the installation angle 3007 (a) by Calculation Expression (2). In step S6002, by changing the relative tilt angle 4002 (b) so that the focus surface matches the standard surface 4010, the relative tilt angle 4002 (b) at that time is uniquely determined by Calculation Expression (1). Thus, the system controller 1003 can obtain the installation angle 4004 (a) based on Calculation Expression (2).

Subsequently, in step S6004, the system controller 1003 obtains the distance 4005 (D1) based on the subject height h, the distance 4003 (D) to the standard surface, and the installation angle 4004 (a) obtained in step S6003 by Calculation Expression (3). In step S6005, the system controller 1003 determines the focal length f1 at the time of focusing on the subject which is at the position of the distance D1 based on the distance 4005 (D1) to the subject obtained in step S6004. Further, in step S6006, the system controller 1003 obtains the relative tilt angle 4006 (b1) based on the distance 4005 (D1), the installation angle 4004 (a), and the focal length f1 by Calculation Expression (1). In step S6007, the system controller 1003 outputs the obtained relative tilt angle 4006 (b1) to the image sensor controller 1009. The image sensor controller 1009 changes the relative tilt angle by causing the image sensor driving unit 1008 to drive the image sensor 1051. Further, the system controller 1003 outputs the obtained focal length 3006 (f1) to the focus controller 1007. The focus controller 1007 changes the position of the lens by causing the lens driving unit 1005 to drive the lens.

As described above, by moving the focus surface horizontally to a desired height after matching the focus surface of the relative tilt to the standard surface temporarily, it is possible to supply a video which is in focus at the desired height more simply even when the face of a person is not in an image.

The relative tilt angle b1 and the focal length f1 obtained in the foregoing flow may be stored in the storage unit 1004. For example, the surveillance camera 1000 may have a plurality of types of operation modes such as a day mode in which imaging is performed under a visible-light environment and a night mode in which imaging is performed under an infrared environment. In this case, by detecting that an imaging environment is dark, the system controller 1003 changes from the day mode in which imaging is performed under the visible-night environment to the night mode in which imaging is performed under the infrared environment by radiating infrared illumination. At this time, it is necessary to obtain the relative tilt angle b1 and the focal length f1 after the mode change and readjust the relative tilt angle and the focal length. The system controller 1003 acquires adjustment amounts of the relative tilt angle and the focal length after the change in the mode based on the relative tilt angle b1 and the focal length f1 stored in the storage unit 1004 in this case and changes the adjustment amounts of the relative tilt angle and the focal length. In this way, even after the change in the mode, it is possible to simply supply a video which is in focus. Only one of the relative tilt angle b1 and the focal length f1 may be stored in the storage unit 1004.

Second Embodiment

In the following second embodiment, a user interface supplied to a user using the control apparatus 1100 when the focus surface is moved to a constant height in focus and image sensor tilt of a surveillance camera will be described.

Figure 7:
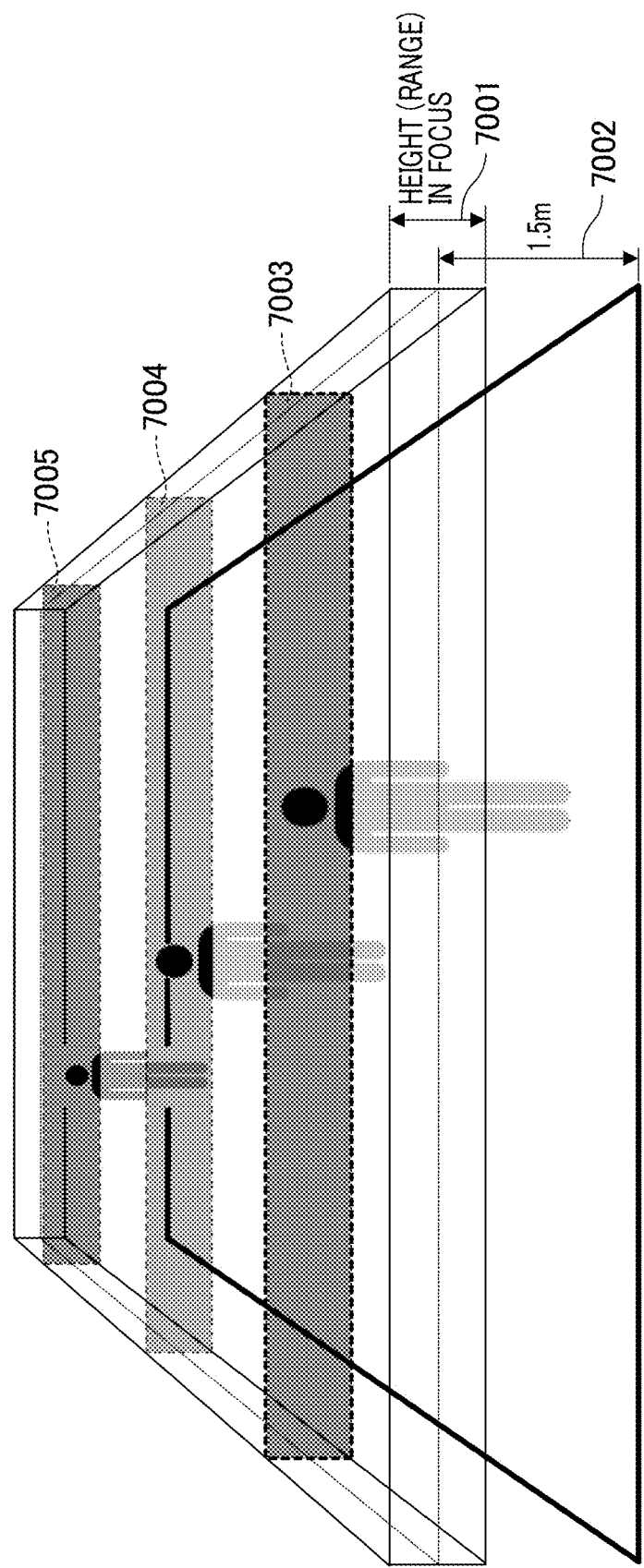
FIG. 7 is a schematic diagram illustrating an example of a user interface according to a second embodiment

FIG. 7 is a schematic diagram illustrating an example of a user interface according to the second embodiment. FIG. 7 schematically illustrates a range in which focus is achieved in a state in which the focus surface is raised to a constant height (for example, 1.5 m or the like in the case of the height of a face) in the horizontal direction. In FIG. 7, a height 7002 indicates a height to which the focus surface is moved horizontally. A range 7001 indicates a range (depth of field) in which focus is actually achieved centering on the focus surface. Focus is lost outside of an upper limit and a lower limit of the height of the range 7001. In FIG. 7, a portion which is within the range 7001, specifically, a portion above the shoulder of a person (subject) in the front, the middle, and the rear, is in focus. A range 7003, a range 7004, and a range 7005 are ranges in which focus is achieved at the positions of the person in the front, the middle, and the rear. That is, in the user interface, ranges in which an image acquired from the surveillance camera 1000 is in focus are superimposed.

A method of displaying the user interface (UI) for a user is not particularly limited. For example, a user may be able to perform an operation of moving the range 7003 from the front to the rear so that the range in which focus is achieved can be changed. In this way, the user can ascertain in which range and at which position focus is achieved. A range intended by the user can easily become in focus. For example, the range 7003 may be moved by displaying a slide bar or the like and operating the slide bar.

As described above, it is possible to supply the user interface so that the user can more easily comprehend a focus state at the desired height.

Third Embodiment

Hereinafter, in a third embodiment, a user interface in which information regarding a depth direction is added in an actual installation environment will be described.

Figure 8:
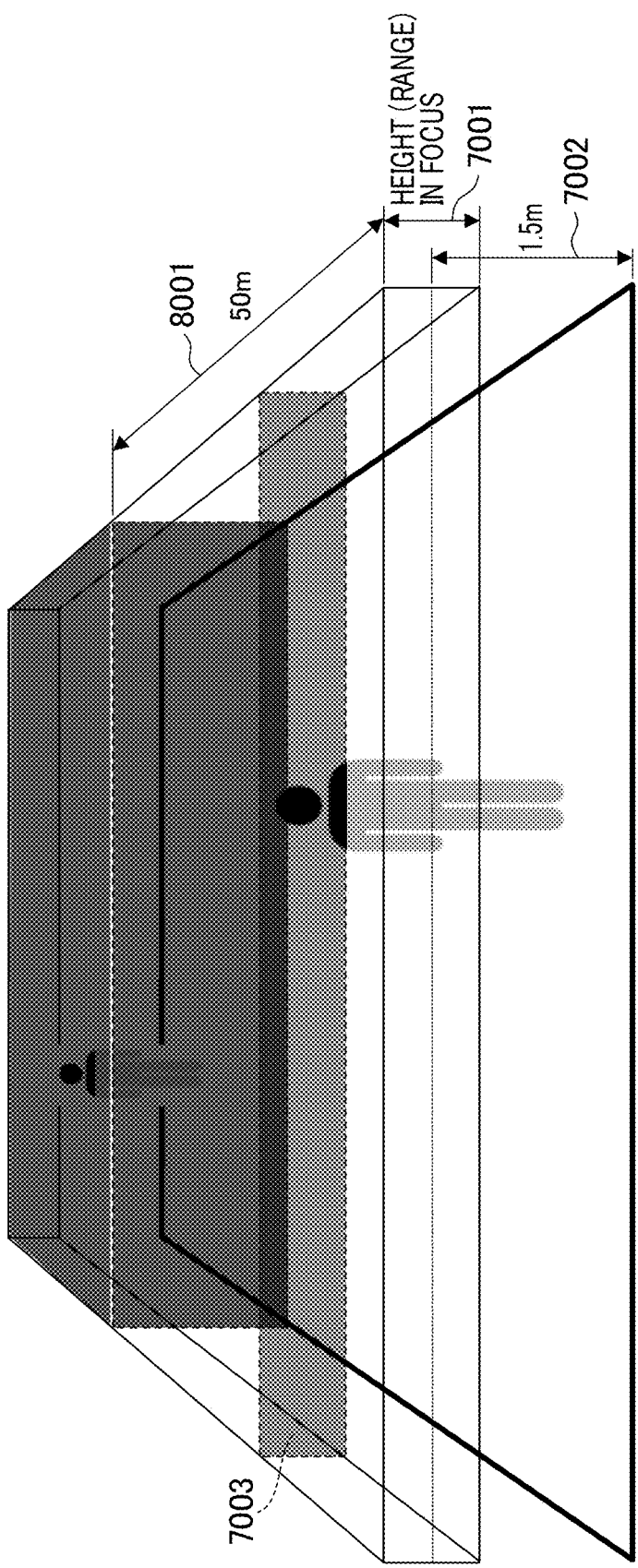
FIG. 8 is a schematic diagram illustrating an example of a user interface according to a third embodiment.

FIG. 8 is a schematic diagram illustrating an example of a user interface according to a third embodiment. For example, when a depth is about 50 m and there is a wall in front depending on an installation environment of the surveillance camera 1000, focus on a portion 50 m or farther is meaningless. Therefore, as illustrated in FIG. 8, a range in which focus is achieved may be displayed in addition to depth information of a space in which the surveillance camera 1000 performs imaging (imaging space). In FIG. 8, based on depth information 8001 set in advance in the surveillance camera 1000, a range in which focus is achieved is schematically displayed in addition to the depth information.

In this way, by displaying the range, it is possible to ascertain a range desired to be in focus in accordance with a user environment. For example, it is easy to ascertain the range even when a relative tilt angle is minutely adjusted finally. As described above, by displaying the range in consideration of depth in accordance with a user environment, it is possible to supply the user interface which is easy for the user to understand.

Other Embodiments

Embodiment(s) of the present invention can also be realized by a computer of a system or apparatus that reads out and executes computer executable instructions (e.g., one or more programs) recorded on a storage medium (which may also be referred to more fully as a :non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RA M), a read only memory (ROM), a storage of distributed computing systems, an optical disk (such as a compact disc (CD), digital versatile disc (DVD), or Blu-ray Disc (BD)ù), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-224453, filed Nov. 30 2018, which is hereby incorporated by reference wherein in its entirety.

What is claimed is:

1. An imaging apparatus comprising:
   a hardware processor; and
   a memory for storing instructions to be executed by the hardware processor, wherein, when the instructions stored in the memory are executed by the hardware processor, the imaging apparatus functions as:
   a tilt angle controller configured to change a tilt angle between a plane orthogonal to an optical axis of an imaging optical system and an imaging plane of an image sensor;
   an acquisition unit configured to acquire a first angle based on a tilt angle when focusing on a first surface by tilting the imaging sensor and a distance from the first surface; and
   a determination unit configured to determine a tilt angle when focusing on a second surface corresponding to a height of a subject, based on height information of the subject, the distance to the first surface, and the first angle.

2. The imaging apparatus according to claim 1, wherein the acquisition unit acquires a distance to the subject based on the height information of the subject, a distance from the first surface, and the first angle.

3. The imaging apparatus according to claim 2, wherein the acquisition unit acquires a focal length when focusing on the subject based on the distance to the subject.

4. The imaging apparatus according to claim 1, wherein, when the instructions are executed by the hardware processor, the image apparatus further functions as:
a storage unit configured to store the height information of the subject.

5. The imaging apparatus according to claim 4,
wherein the storage unit stores at least one of a tilt angle when focusing on a second surface and a focal length when focusing on the subject, and
wherein, when a plurality of modes are included as operation modes and the mode is changed, the acquisition unit acquires adjustment amounts of the tilt angle and the focal length after the change in the mode based on at least one of the tilt angle and the focal length stored in the storage unit.

6. The imaging apparatus according to claim 1, wherein the first angle is an angle between the optical axis and the first surface.

7. An imaging apparatus comprising:
a hardware processor; and
a memory for storing instructions to be executed by the hardware processor, wherein, when the instructions stored in the memory are executed by the hardware processor, the imaging apparatus functions as:
a tilt angle controller configured to change a tilt angle between a plane orthogonal to an optical axis of an imaging optical system and an imaging plane of an image sensor;
an acquisition unit configured to acquire a first angle based on a tilt angle when focusing on a first surface by tilting the imaging sensor and a distance from the first surface; and
a determination unit configured to determine a tilt angle when focusing on a second surface corresponding to a height of a subject, based on a distance to the subject, the first angle, and a focal length when focusing on the subject.

8. The imaging apparatus according to claim 7, wherein the acquisition unit acquires the distance to the subject based on height information of the subject, a distance from the first surface, and the first angle.

9. The imaging apparatus according to claim 8, wherein the acquisition unit acquires the focal length when focusing on the subject based on the distance to the subject.

10. A control method for an imaging apparatus, the method comprising:
changing a tilt angle between a plane orthogonal to an optical axis of an imaging optical system and an imaging plane of an image sensor;
acquiring a first angle based on a tilt angle when focusing on a first surface by tilting the imaging sensor and a distance from the first surface; and
determining a tilt angle when focusing on a second surface corresponding to a height of a subject, based on height information of the subject, the distance to the first surface, and the first angle.

11. An information processing apparatus acquiring an image from an imaging apparatus and displaying the image, wherein the imaging apparatus includes:
a hardware processor; and
a memory for storing instructions to be executed by the hardware processor, wherein, when the instructions stored in the memory are executed by the hardware processor, the imaging apparatus functions as:
a tilt angle controller configured to change a tilt angle between a plane orthogonal to an optical axis of an imaging optical system and an imaging plane of an image sensor; and
an acquisition unit configured to acquire a first angle based on a tilt angle when focusing on a first surface by tilting the imaging sensor and a distance from the first surface;
a determination unit configured to determine a tilt angle when focusing on a second surface corresponding to a height of a subject, based on height information of the subject, the distance to the first surface and the first angle, and
wherein the information processing apparatus comprises a user interface configured to superimpose a depth of field when focusing on the second surface on the image.

12. The information processing apparatus according to claim 11, wherein, when the instructions are executed by the hardware processor, the imaging apparatus further functions as:
a user interface configured to change a depth of field of the imaging apparatus by operating the depth of field superimposed on the image.

13. The information processing apparatus according to claim 11, wherein, based on depth information of an imaging space, the user interface superimposes the depth of field of only a part of the imaging space on the image.

14. A non-transitory storage medium on which is stored a computer program for making a computer execute a method for an imaging apparatus, the method comprising:
changing a tilt angle between a plane orthogonal to an optical axis of an imaging optical system and an imaging plane of an image sensor;
acquiring a first angle based on a tilt angle when focusing on a first surface by tilting the imaging sensor and a distance from the first surface; and
determining a tilt angle when focusing on a second surface corresponding to a height of a subject, based on height information of the subject, the distance to the first surface, and the first angle.

* * * * *